(12) United States Patent
Lee et al.

(10) Patent No.: US 6,926,759 B1
(45) Date of Patent: Aug. 9, 2005

(54) AIR FILTER

(76) Inventors: Nam H Lee, 1840 E. 75th Ave., #3, Anchorageq, AK (US) 99507; Chin W. Lee, 1840 E. 75th Ave. #3, Anchorage, AK (US) 99507

( * ) Notice: Subject to any disclaimer, the term of this patent is extended or adjusted under 35 U.S.C. 154(b) by 118 days.

(21) Appl. No.: 10/454,982

(22) Filed: Jun. 5, 2003

(51) Int. Cl.[7] ............................................ B01D 47/02
(52) U.S. Cl. ........................... 95/221; 95/226; 55/462; 96/279; 96/306; 96/348; 96/351
(58) Field of Search ........................ 95/216, 221, 226; 55/437, 447, 462, 471, DIG. 3; 96/279, 301, 96/306, 329, 348, 351

(56) References Cited

U.S. PATENT DOCUMENTS

| | | | | |
|---|---|---|---|---|
| 2,076,815 A | * | 4/1937 | Fulweiler | 95/267 |
| 3,296,777 A | * | 1/1967 | Jackson et al. | 96/227 |
| 4,623,366 A | * | 11/1986 | Berfield et al. | 96/406 |
| 5,078,759 A | * | 1/1992 | Kira | 95/223 |
| 5,215,560 A | * | 6/1993 | Lee | 96/330 |
| 5,873,930 A | * | 2/1999 | Sanchez | 96/278 |
| 5,954,863 A | * | 9/1999 | Loveless et al. | 96/321 |
| 6,508,867 B2 | * | 1/2003 | Schoenewald et al. | 96/333 |

* cited by examiner

*Primary Examiner*—Frank M. Lawrence
(74) *Attorney, Agent, or Firm*—Michael J. Tavella

(57) ABSTRACT

An air filter baffle unit that works with large type canister wet/dry type vacuums. The baffle unit also can be used in large air filter systems and can be ganged to increase filtering. The baffle unit has two sections that are connected for use. An inlet pipe is connected to the inlet of the vacuum. This inlet pipe directs the incoming dirt into the baffle unit, where it encounters a number of baffles and a water reservoir before it is expelled as clean air. In this baffle unit, there is no need for paper or other types of filters that must be periodically replaced. In this way, the baffle unit provides a simple, effective mechanism for filtering air using the wet/dry vacuum. The baffle unit can be also placed in an air filtering system that has a housing, an inlet and an outlet.

11 Claims, 15 Drawing Sheets

AIR FILTER

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to air filters and particularly to air filters using water to clean the air.

2. Description of the Prior Art

In my previous U.S. Pat. No. 5,215,560, I disclosed a portable air filtering system that was designed to be used with industrial type vacuums. The baffle unit was designed to be carried by the user in a backpack style. The baffle unit has a water reservoir and a number of baffles to collect dirt and dust and to filter the air before it was exhausted. That baffle unit is useful, but limited in size and scope.

Other industrial type vacuums, such as wet/dry type vacuums have large receptacles to hold waste, but have little in the way of filtering. Most of the filtering in these types of vacuums is used to protect the motor from dust, dirt and water. Dust and dirt held in the canister receptacle can be released through the exhaust and, most often, when the canister is emptied. At that time, the top cover is removed and the entire container is open. Loose dust and dirt can easily escape from the container.

BRIEF DESCRIPTION OF THE INVENTION

The instant invention overcomes all of these problems. It is a new design that works with large type canister wet/dry type vacuums. The baffle unit also can be used in large air filter systems and can be ganged to increase filtering.

The baffle unit has two sections that are connected for use. The baffle unit is designed to fit into the canister of a large type wet/dry vacuum. An inlet pipe is connected to the inlet of the vacuum. This inlet pipe directs the incoming dirt into the baffle unit, where it encounters a number of baffles and a water reservoir before it is expelled as clean air. In this baffle unit, there is no need for paper or other types of filters that must be periodically replaced. In this way, the baffle unit provides a simple, effective mechanism for filtering air using the wet/dry vacuum.

In a second embodiment, the baffle unit can be placed in an air filtering system. In this embodiment, the baffle unit is placed in a housing that has an inlet and an outlet. The baffle unit is positioned between the inlet and the outlet to filter the air. One or more of the baffle units can be placed in a single housing. Additionally, a number of individual housings containing one or more of the baffle units can be connected to provide a ganged level of air filtering.

DETAILED DESCRIPTION OF THE INVENTION

Figure 1:
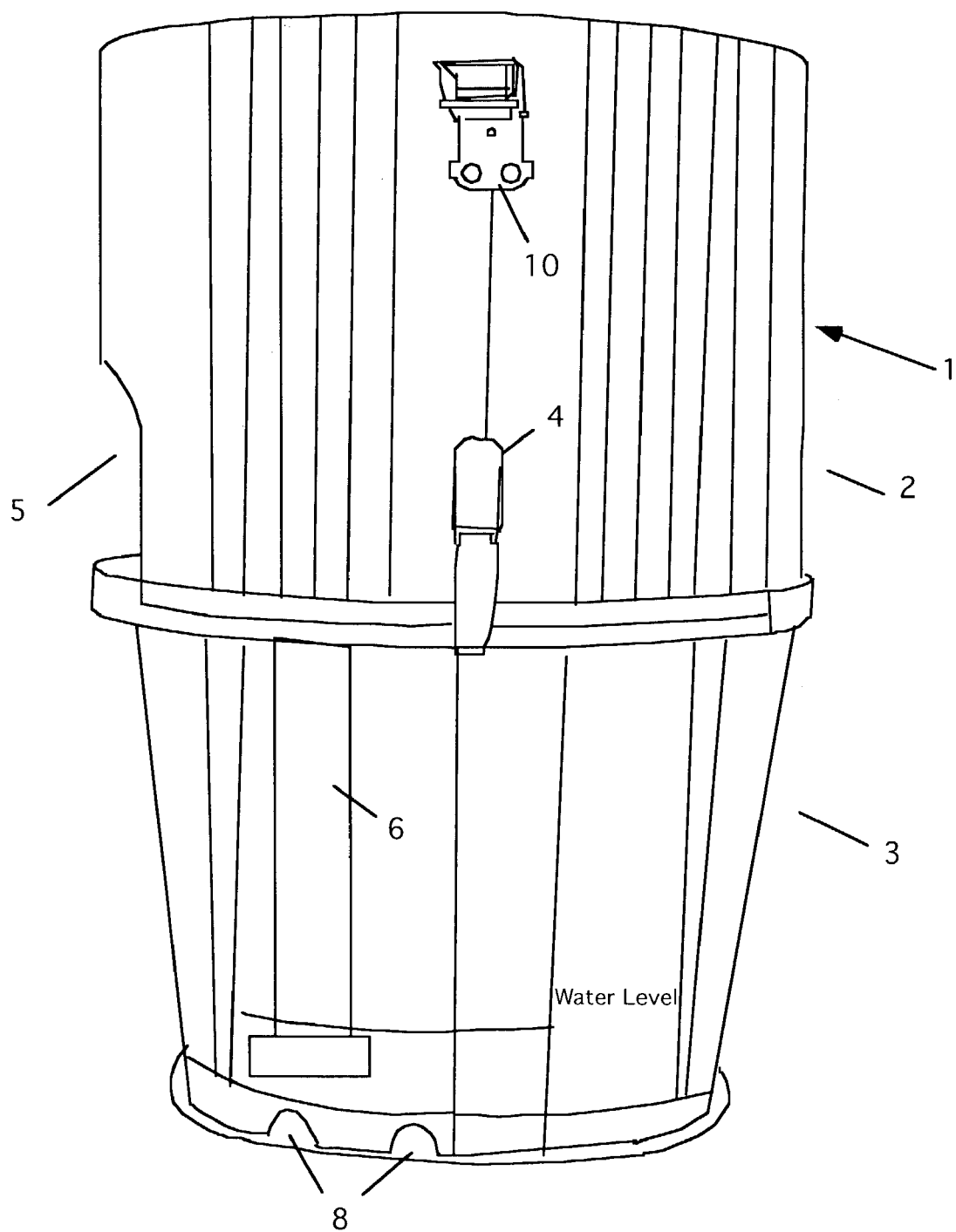
FIG. 1 is a front view of the assembled baffle unit without the vacuum motor in place.

Referring now to FIGS. 1, 2, 3 and 4, the basic assembled baffle unit 1 is shown FIG. 1 shows front view of the assembled baffle unit 1 without the vacuum motor in place. In the preferred embodiment, the baffle unit 1 has an upper, or top, portion 2 and a lower, or bottom, portion 3. The upper portion 2 and the lower portion 3 are attached for use with snap clamps 4. The clamps 4 shown in the figures are one type that can be used. However, any other similar type of clamp can be used as well. The clamps secure the top portion 2 to the lower portion 3. In the preferred embodiment, the connection of the top portion to the bottom portion makes an airtight seal. This ensures that a proper vacuum is developed, as discussed below. These figures also show a second set of snap type clamps 10 that are installed on the top of the upper portion 2 as shown. These clamps are used to attach the baffle unit to the vacuum drive motor 110 as discussed below.

Figure 2:
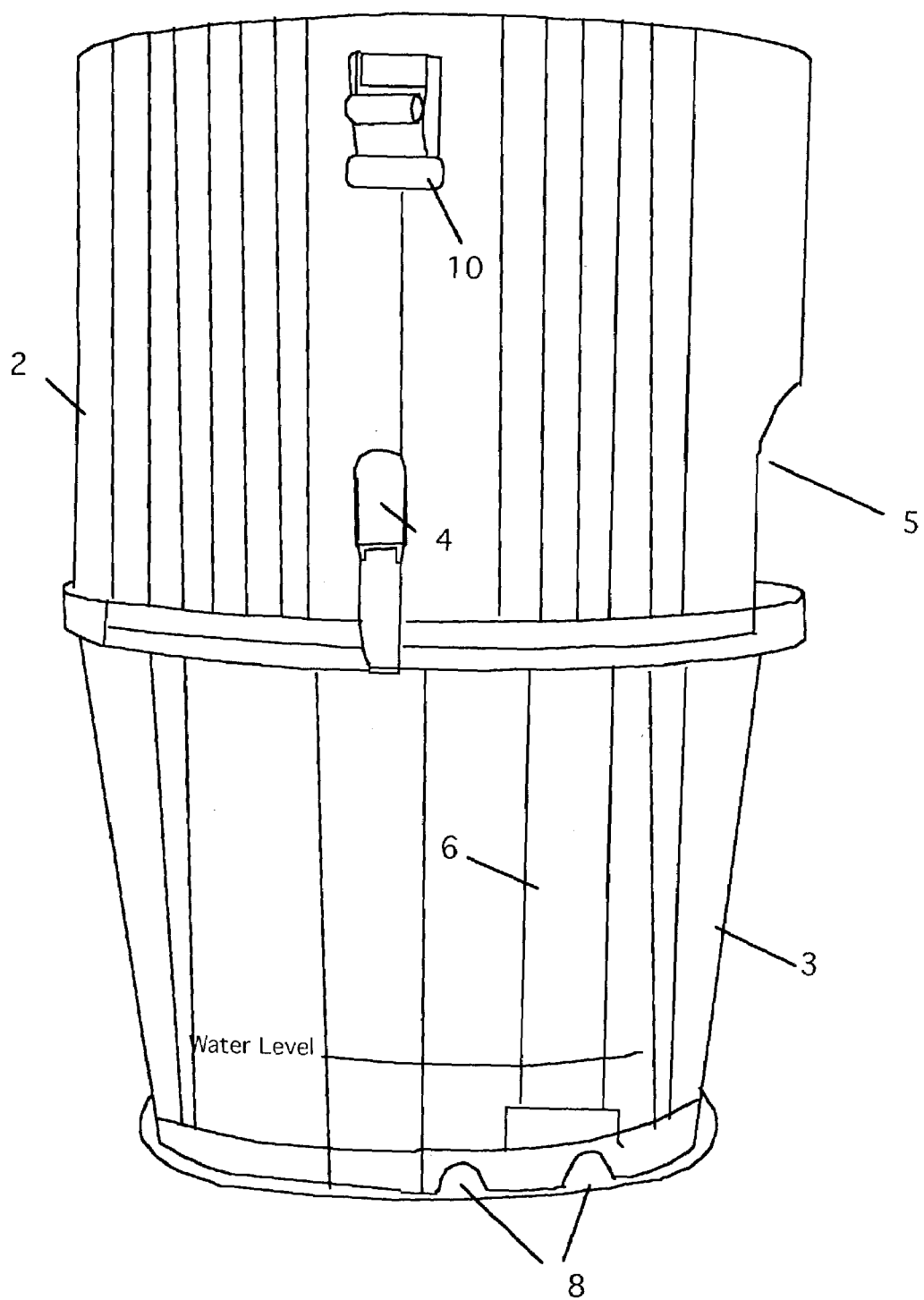
FIG. 2 is a rear view of the assembled baffle unit without the vacuum motor in place.

FIG. 2 is a rear view of the assembled baffle unit 1 without the vacuum motor in place. In this view, the backside clamps 4 are shown.

Figure 3:
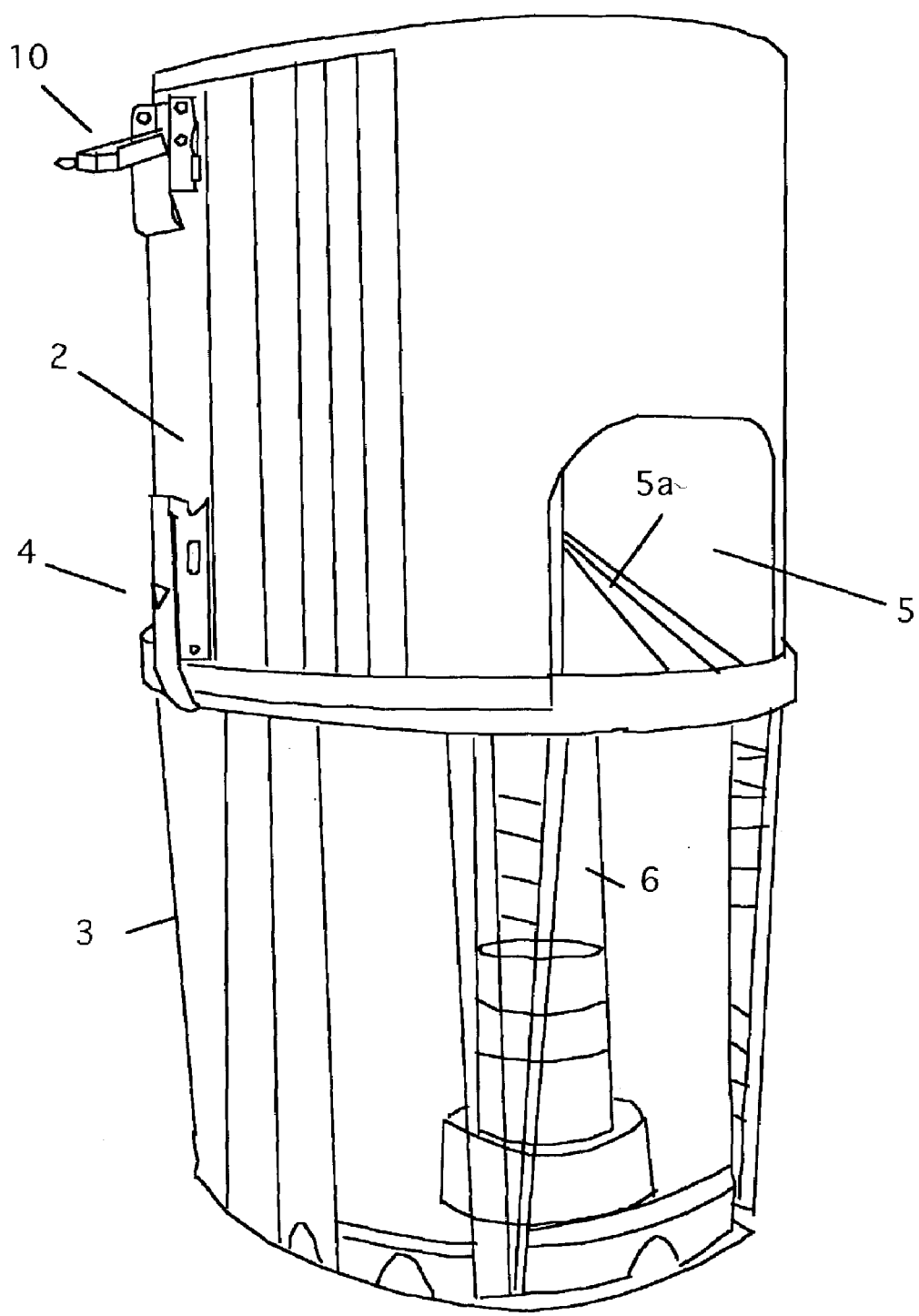
FIG. 3 is a left side view of the assembled baffle unit without the vacuum motor in place.

FIG. 3 is a left side view of the assembled baffle unit 1 without the vacuum motor in place. In this view, the intake port 5 is shown. As discussed below, air that is brought into the canister of the vacuum is drawn up into the upper portion 2 through the intake port 5. This view also shows the transfer tube 6 that is installed in the lower portion 3.

Figure 4:
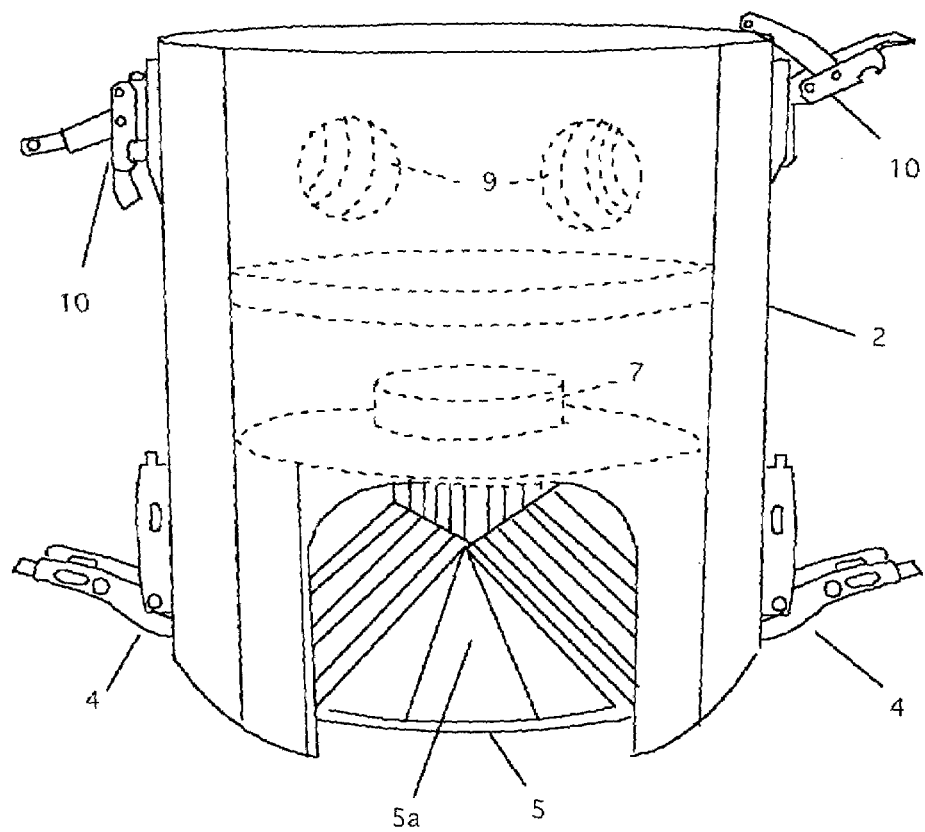
FIG. 4 is a right side view of the upper half of the baffle unit.

FIG. 4 is a right side view of the upper portion 2 of the baffle unit 1. This view shows the intake port 5 clearly. The intake port 5 has a beveled portion 5a that helps gather the incoming air and directs it upward to the first set of fixed fan blades 7. See also FIG. 12. The fixed fan blades 7 are designed to catch the large particles as they are drawn through the fixed blades. The blades cause the airflow to swirl, which forces the heavier particles to move outward where they are easily caught. The lighter particles pass through the blades to the next level of filtration, which are the baffles 14 and 15 (see e.g., FIG. 6). The air coming from the first set of fixed fan blades 7 enters the baffles 14 and 15 through holes 9 formed in the top portion as shown in FIG. 4.

Figure 5:
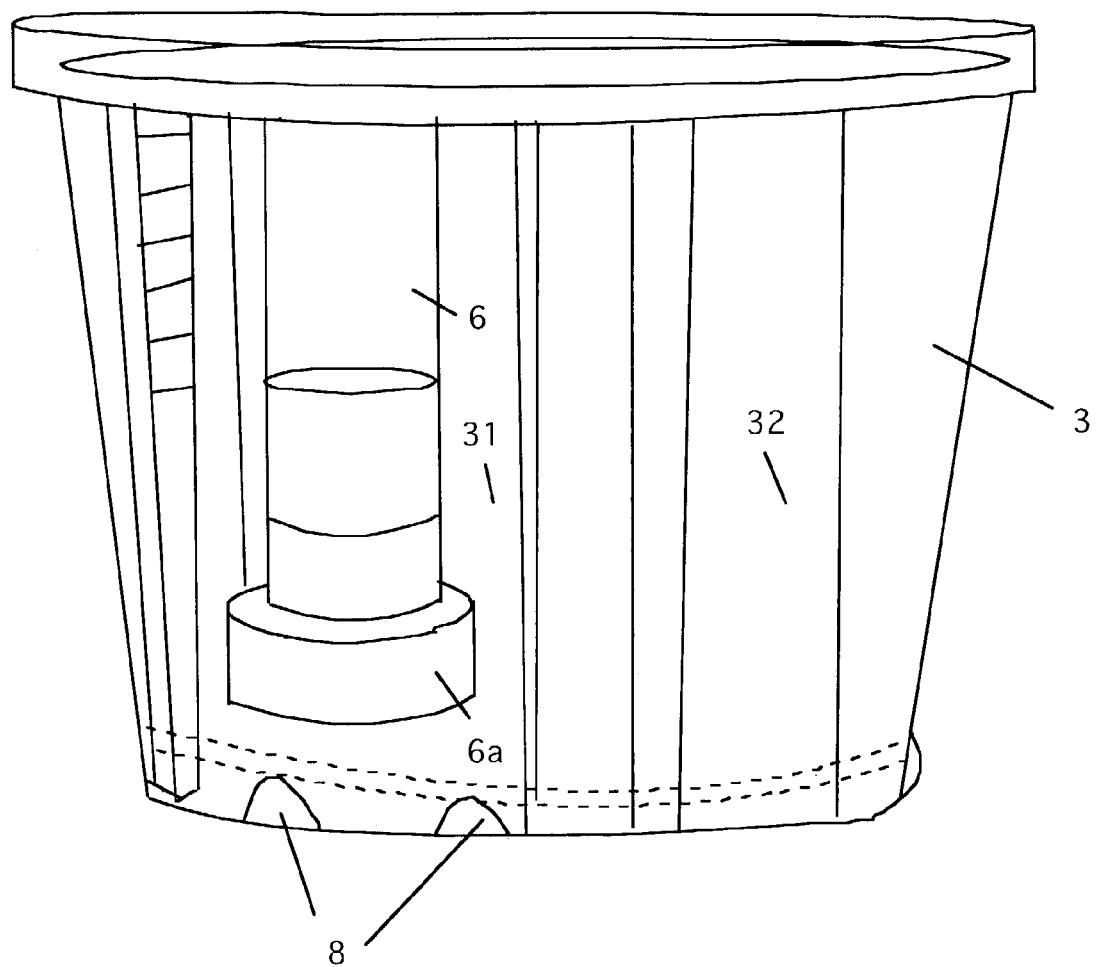
FIG. 5 is a detail side view of the lower portion of the baffle unit.

FIG. 5 is a detail side view of the lower portion of the baffle unit. Here, the transfer tube 6 is shown. The transfer tube 6 moves the air from the upper portion to the lower portion. It has a base 6a that directs the airflow into the lower portion 3. As shown in FIGS. 1, 2 and 3, a water level line is printed on the outside of the baffle unit. Water is placed into the lower portion to the level mark. The lower portion of the transfer tube 6 sits in the water and is completely covered by water when the baffle unit is in operation. Note that holes 8 are provided in the bottom portion to allow water trapped in the side walls to leave the unit. This is discussed in more detail below.

Figure 6:
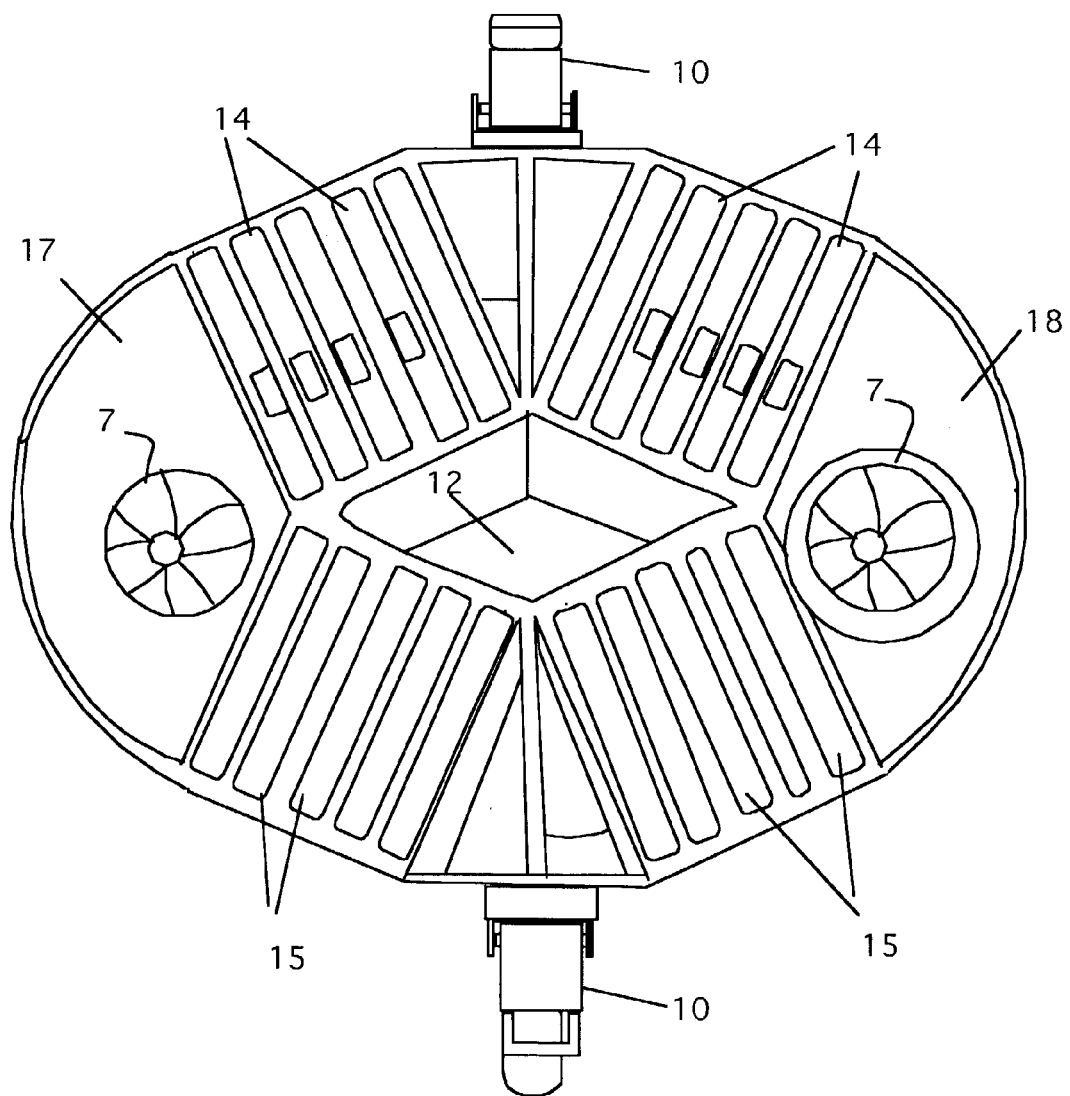
FIG. 6 is a top view of the upper portion of the baffle unit.

Air is moved from the upper portion to the lower portion through a series of baffles and channels. FIG. 6 is a top view of the upper portion of the baffle unit. This view shows the baffles and air channels within the baffle unit. There are two pairs of baffles 14 and 15 that are spaced about a center opening 12. The center opening 12 is designed to receive the lower portion of the vacuum motor 110 when it is installed on the upper portion. The vacuum motor housing is secured to the upper portion using the clips 10. See, e.g., FIG. 9. Of course, the center opening 12 can be sized and shaped to accommodate any particular motor base used in any particular style vacuum. This figure is for illustration only.

FIG. 6 also shows two channels 17 and 18. These channels are used to direct the airflow through the device as discussed below.

Figure 7:
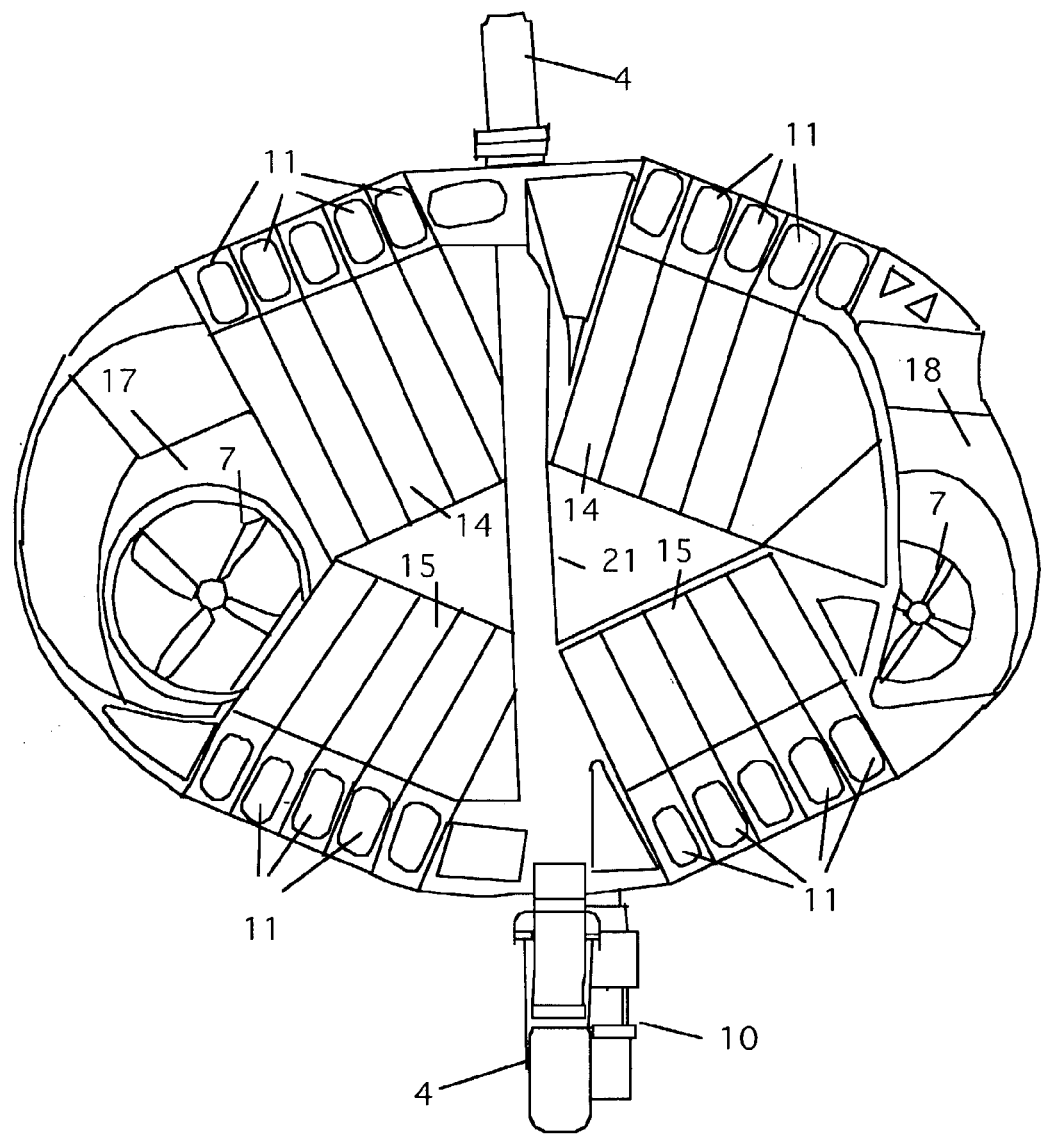
FIG. 7 is a bottom view of the upper half of the baffle unit.

FIG. 7 is a bottom view of the upper half of the baffle unit. This view shows the upper portion looking up from the bottom. The clip 10 is shown as well as the clips 4, which are used to secure the upper portion to the lower portion. Note that in this view the bottom of the upper baffle unit has a divider 21 formed across the center. Note also the structure of the two channels 17 and 18.

Finally, FIG. 7 shows a number of holes 11 formed between the walls of the baffle unit in the chambers 14 and 15. These holes allow any water that is picked up in the air stream to pass through the top portion into the lower portion, where it can be released in the vacuum canister, as discussed below.

Figure 8:
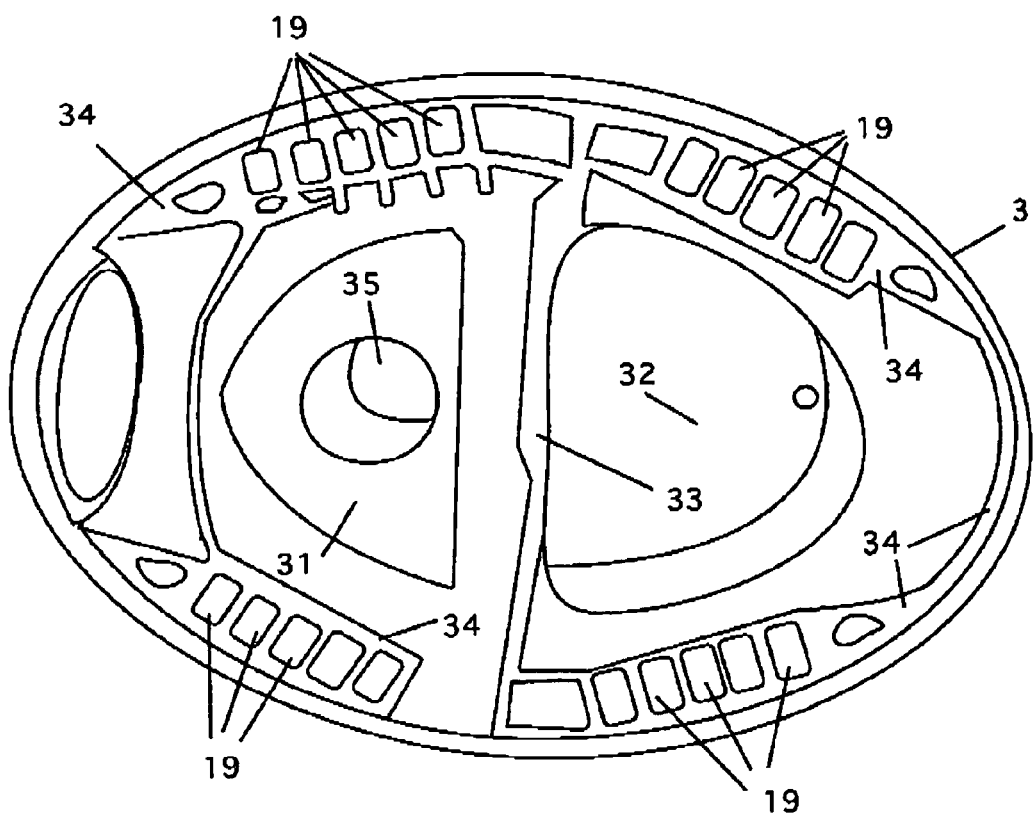
FIG. 8 is a top view of the lower portion of the baffle unit.

FIG. 8 is a top view of the lower portion of the baffle unit. The lower portion of the device has two divided compartments 31 and 32. A divider wall 33 is formed between them. Holes are formed in the bottom of this divider wall to ensure proper airflow through the device. A gasket 34 is placed over the top of the edges of the lower baffle unit as shown. This gasket seals the upper and lower portions and ensures that any loose dirt or dust cannot escape the device. Holes 19 formed in the gasket align with the holes 11 in the upper unit to allow any trapped water to fall into the lower unit. Note that this water leaves the baffle unit through the holes 8 formed in the bottom of the lower unit. Note also that the holes 8 are on the outside on the side of the baffle unit having the transfer tube 6 and on the inside on the other side of the lower unit. This is because excess water has more room to be held on the outgoing side of the device. Water trapped in the side walls on the transfer tube side, can build up to where the upper intake baffles 14 and 15 become filled with water and eliminate further air flow through the device. Note also that this figure also shows a cavity 35 formed in the lower unit 3 to accommodate the transfer tube 6 when it is installed.

Figure 9:
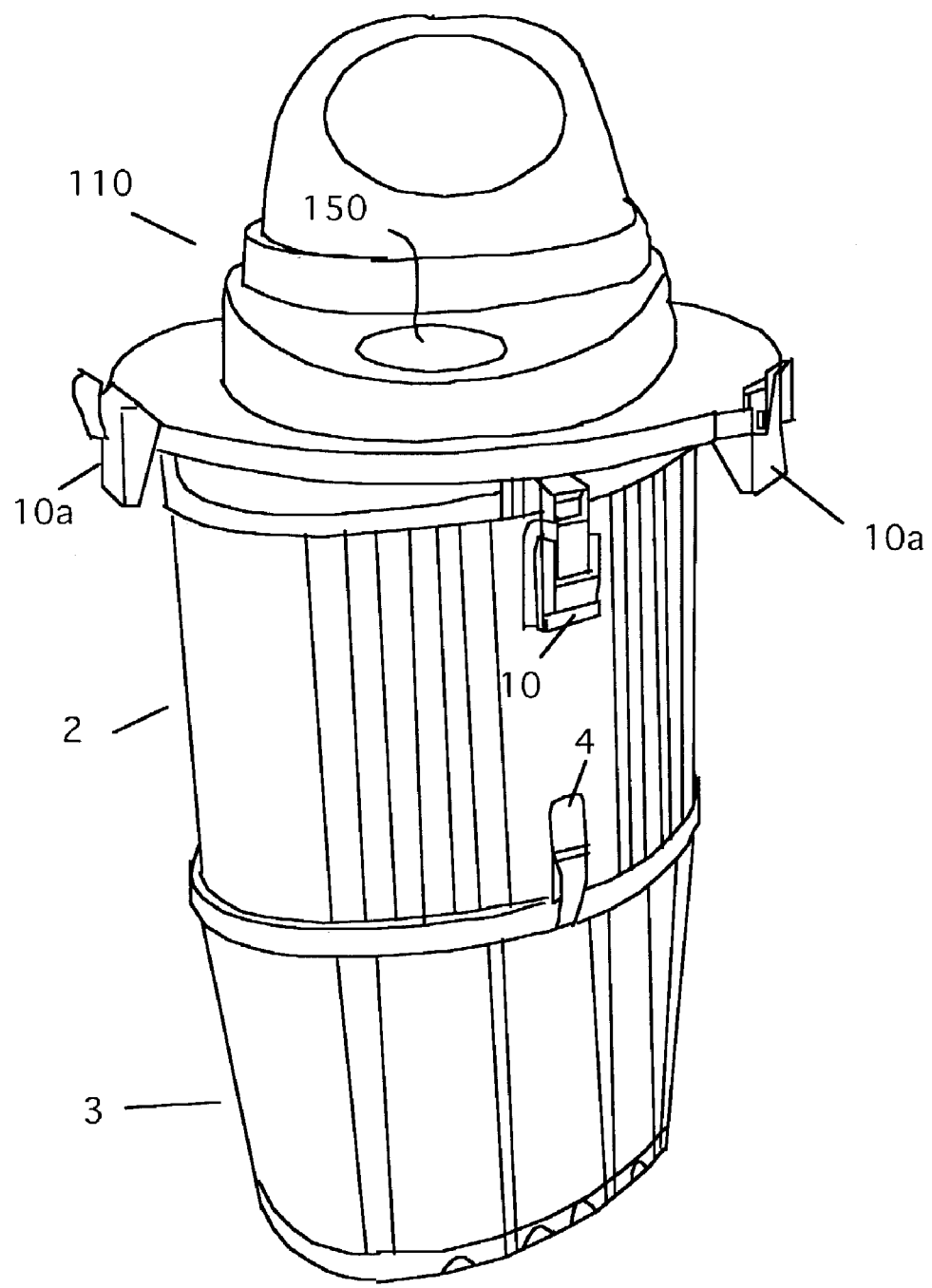
FIG. 9 is a perspective view of the assembled baffle unit with the vacuum motor positioned on top of the unit, but not locked in place.

FIG. 9 is a perspective view of the assembled baffle unit with the vacuum motor 110 positioned on top of the baffle unit, but not locked in place. In this figure, the motor drive 110 is placed on the upper baffle unit. Note also that this figure shows the upper and lower baffle units assembled and held by clips 4. In use, the upper baffle unit is clipped to the drive motor using clips 10 on the housing, which mate with clips 10a on the motor 110. Then the assembled baffle unit is placed into the vacuum housing. Note that to secure the motor to the housing, the motor must be rotated from the position as shown in FIG. 9 so that the clips 10 and 10a align.

Figure 10:
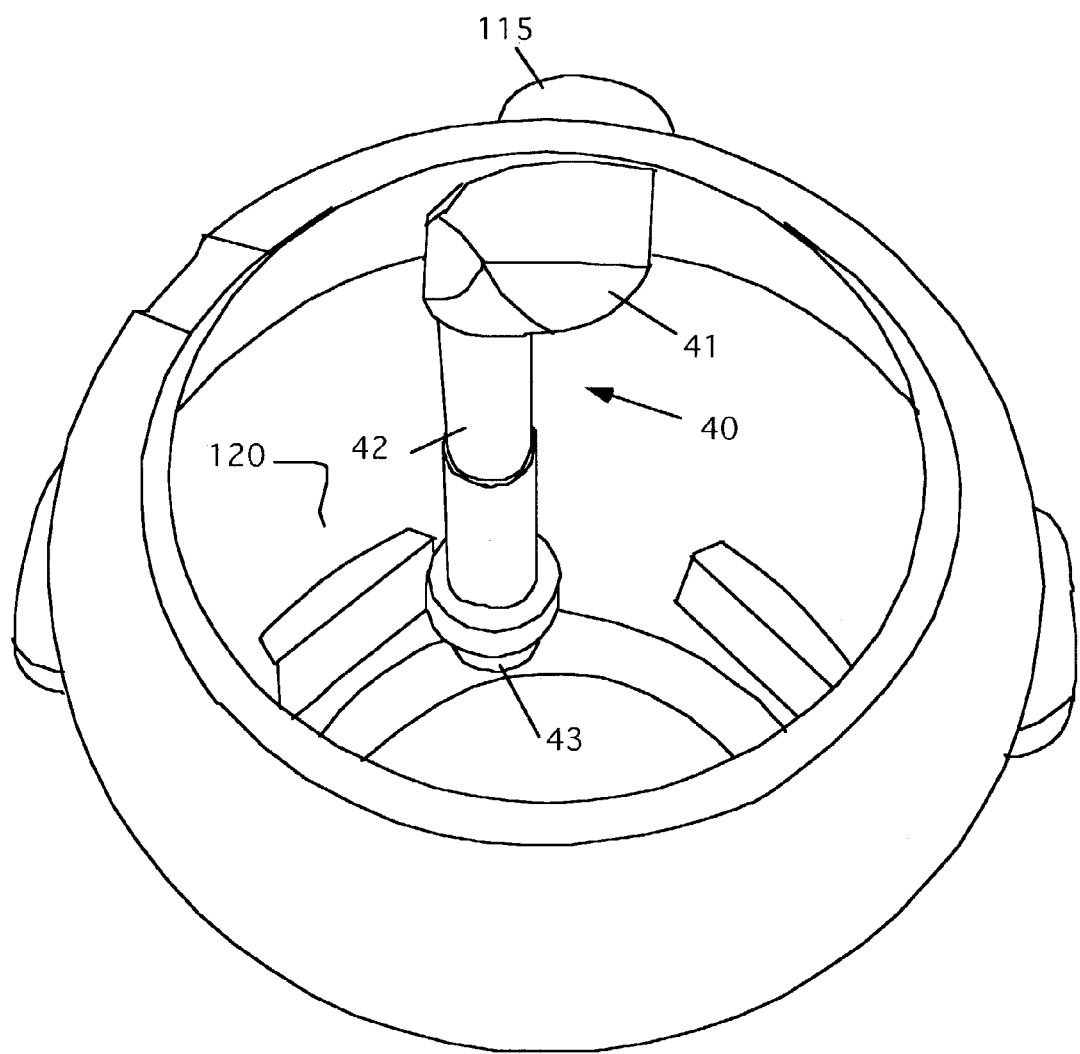
FIG. 10 is a perspective view of the interior of the canister of a wet/dry vacuum with the inlet pipe installed.

FIG. 10 is a perspective view of the interior of the canister of a wet/dry vacuum with the inlet pipe installed. In typical prior art use, a vacuum hose is connected to the inlet fitting 115 on the canister. Air is then pulled into the canister by the motor and dirt and debris are dumped into the canister and held until disposed. As noted above, the dirt and dust is not contained in any way so that when the canister is opened, dust and dirt particles are free to contaminate anything exposed to the open canister. In the instant invention, the inlet pipe 40 is installed within the canister 120 as shown. Here, the inlet pipe 40 has an intake portion 41 that attaches to the inlet fitting. The intake portion 41 has an exit port that attached to a length of pipe 42 as shown. At the bottom of the pipe 42 is a discharge port 43 that direct the incoming air into the bottom of the canister, where a quantity of water is kept. Thus, the inlet pipe 40 forces the dirty air into the bottom of the canister where it is discharged into water. As discussed below, the water traps much of the dust and heavy particles.

Figure 11:
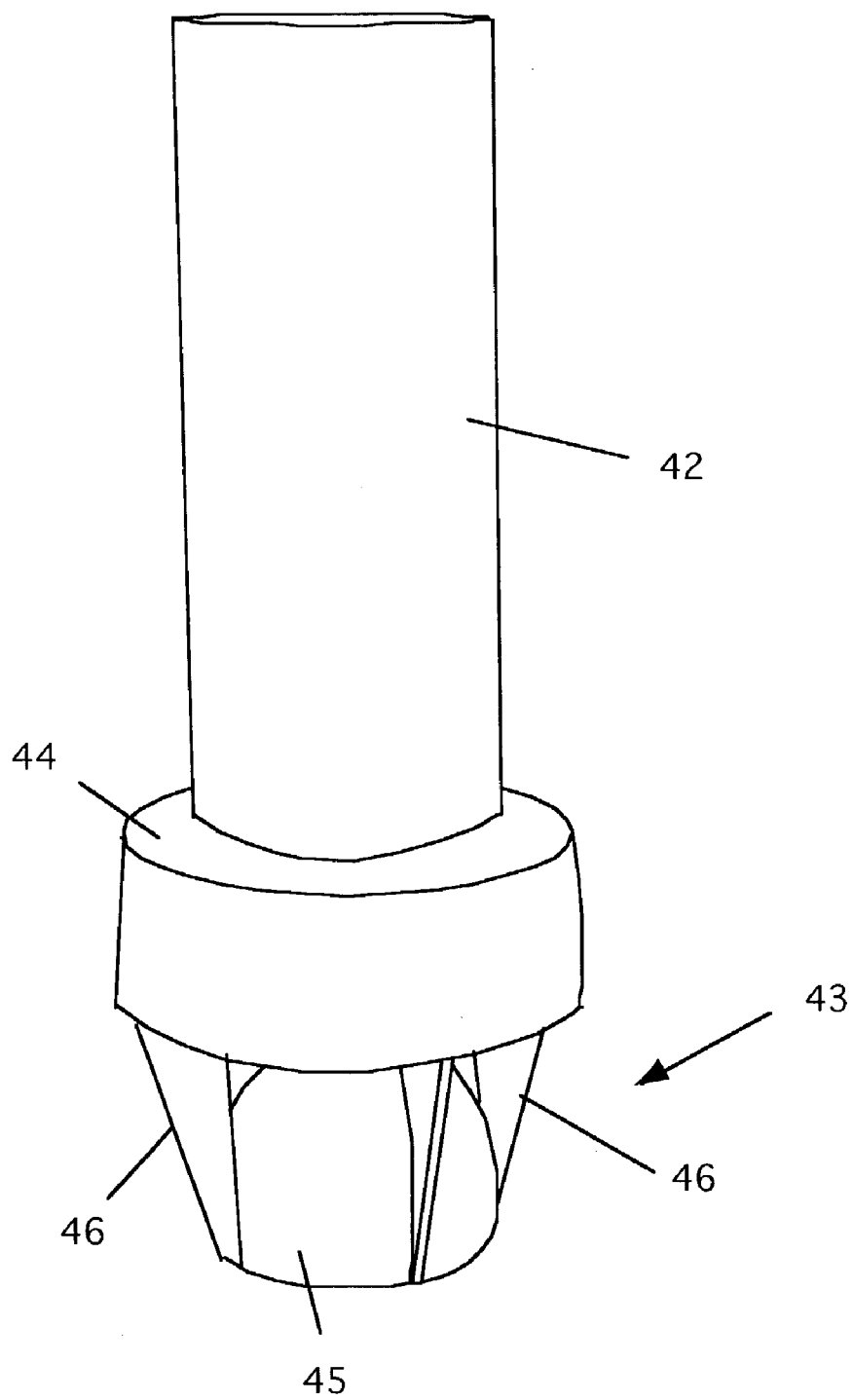
FIG. 11 is a detail view of the lower portion of the input pipe.

FIG. 11 is a detail view of the lower portion of the input pipe. Here, the discharge port 43 is shown in detail. The discharge port has a top ring 44 and a lower half ball 45 that is connected to the upper ring by a set of pylons 46. As shown, there is open space between the ring and the half ball. This is where the air exits the inlet pipe. Note that in some instances a floating ring is used without the half ball. This design is not as effective, however, because the float can become clogged with dirt, which causes it to become stuck, thereby limiting the effective airflow through the device.

Figure 12:
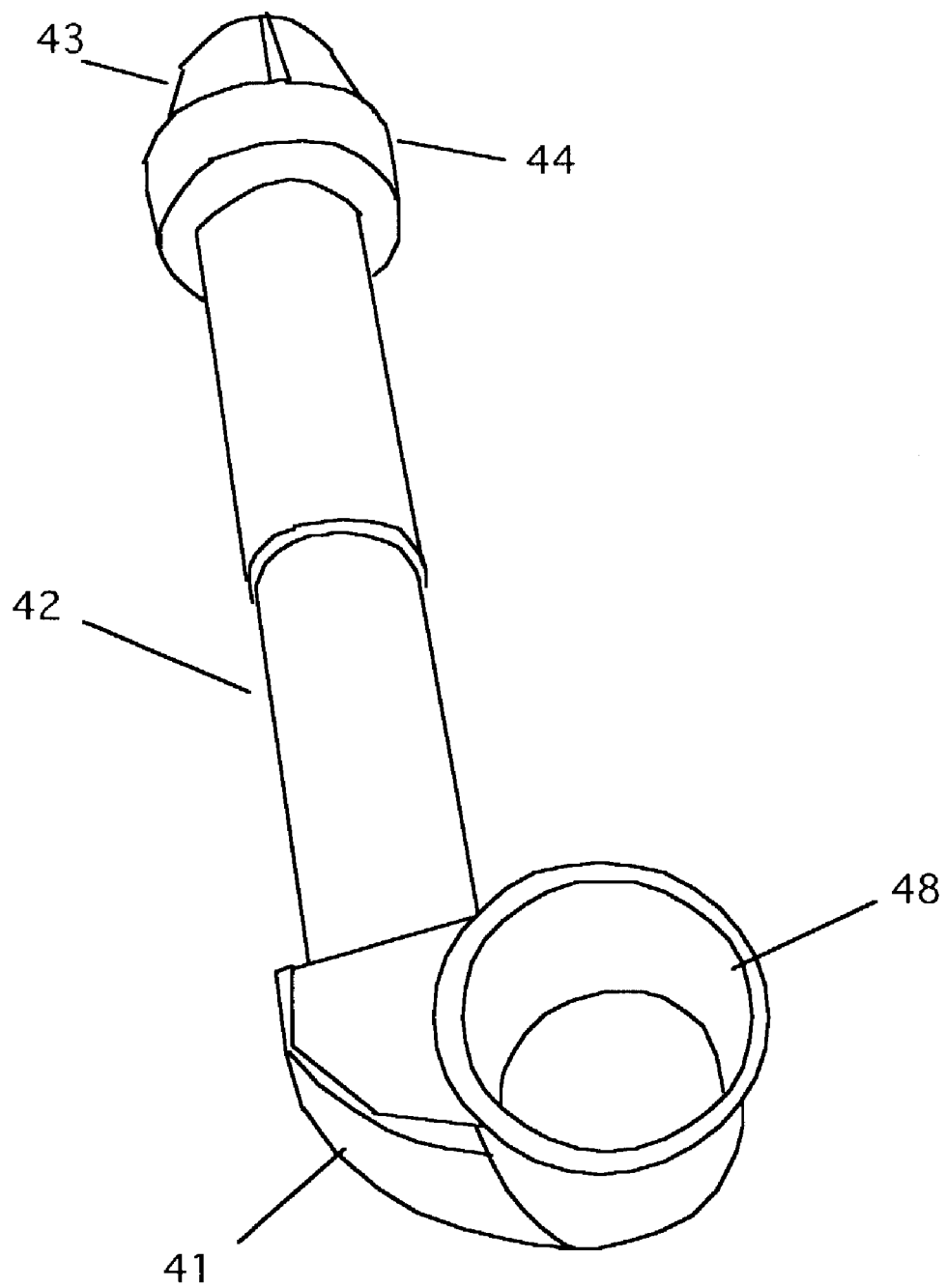
FIG. 12 is a perspective view of the assembled inlet pipe.

FIG. 12 is a perspective view of the assembled inlet pipe. This view shows that attachment flange 48 that connects to the inlet fitting 115 on the canister. Note that the length of the inlet pipe and the exact configuration of the intake portion can be adjusted and modified to meet the requirements of any particular vacuum baffle unit in use. Such modifications are well within the skill of a person in the art.

Figure 13:
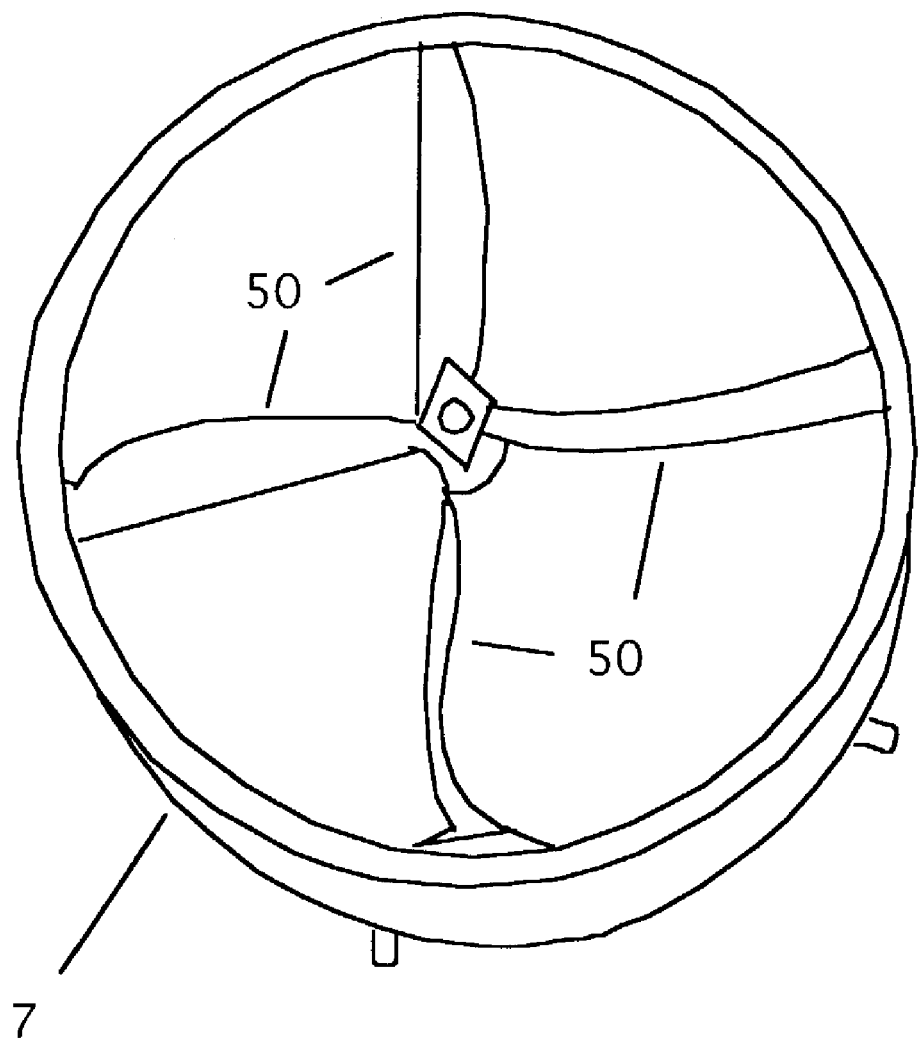
FIG. 13 is a detail view of the fixed fan blade collector.

Finally, FIG. 13 is a detail view of the fixed fan blade collector 7. There are two collectors. As discussed above, the blades 50 are fixed. As air passes through the fan blades, heavier particles are trapped and lighter particles are free to pass through into the next stage of filtering.

Figure 14:
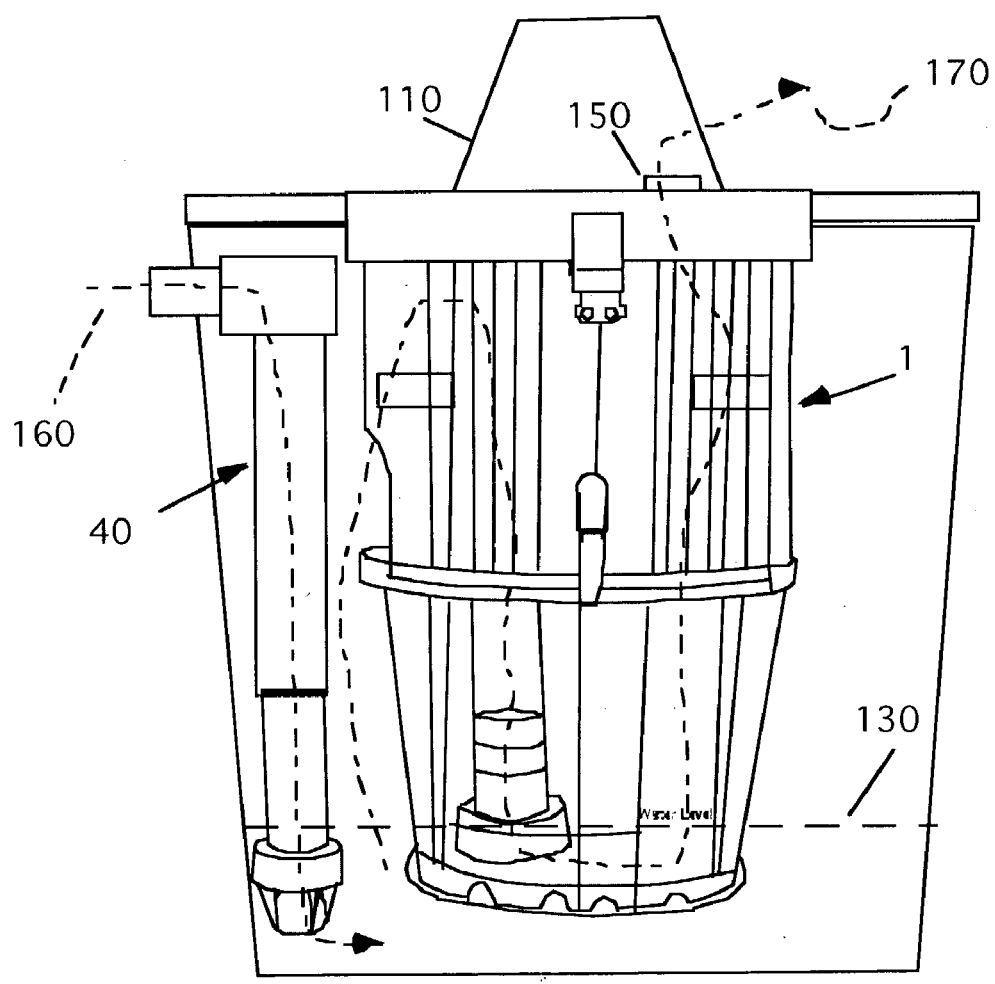
FIG. 14 is a cut away view of a canister vacuum showing the baffle unit in place and the airflow through the device.

FIG. 14 is a cut away view of a canister vacuum showing the baffle unit in place and the airflow through the device. Here, intake air 160 (shown as the dashed line) flows into the inlet tube 115, down through the inlet pipe 40 and into the water 130 held in the bottom of the canister. It passes through water 130 and up into the intake 5 of the upper housing. It then passes through the first fixed fan blade 7, through the baffles, into the transfer tube 6 into the lower portion of the housing. There, it passes through more water, after which it is pulled up through the second fixed fan 7, and the final set of baffles. It is then discharged from the unit as clean exhaust air 170 by passing through the normal discharge port 150 on the vacuum.

This baffle unit is thus capable of providing a level of highly filtered air without the use of replaceable filters. Moreover, it is easily cleaned and serviced.

Figure 15:
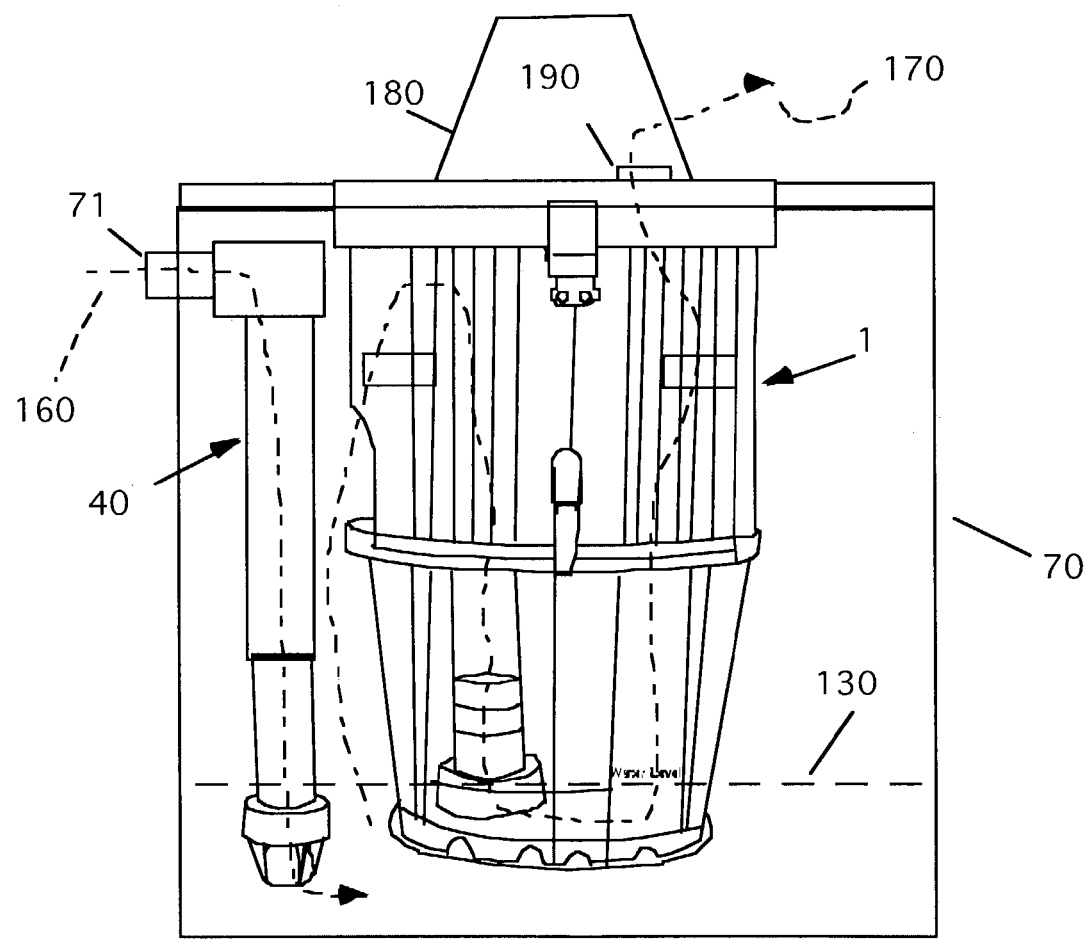
FIG. 15 is a detail view of the baffle unit as installed in an air filtering system.

As mentioned above, the baffle unit can be used also in air filtering systems as well as in vacuums. FIG. 15 is a detail view of the baffle unit as installed in an air filtering system. As shown there is a box housing 70, and an intake port 71, which is connected to a source of air (a duct, an inlet grate, etc). Air then enters into the box housing 70 using the intake pipe 40, as before, and passes through the water 130 and baffle unit as discussed above. A motor 180 is installed on the top of the box housing to pull air through the unit. The filtered air 170 leaves the unit through an exhaust port 190, where it then enters an outlet duct (not shown), where it can be distributed as desired.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

What is claimed is:

1. An air filter comprising:
   a) a housing having an upper portion and a lower portion;
   b) said upper portion having an air inlet side and an air outlet side, said upper portion further having a divider formed between said air inlet side and said air outlet side such that air cannot pass directly from the air inlet side to the air outlet side;
   c) an air inlet port, formed in said air inlet side of said upper portion;
   f) a first plurality of baffles, installed in said air inlet side of said upper portion;
   g) a second plurality of baffles formed in said air outlet side of said upper portion;
   h) an air outlet port, formed in said outlet side of said upper portion;
   i) said lower portion of said housing having an air inlet side and an air outlet side, said lower portion further having a divider, having a top and a bottom, formed between said air inlet side and said air outlet side said divider having an opening at the bottom of said divider such that air can pass directly from the air inlet side to the air outlet side through said opening; and
   j) a transfer tube, extending from said air inlet side of said upper portion to said air inlet side of said lower portion.

2. The air filter of claim 1 further comprising:
   a) a first set of fixed fan blades, installed in said air inlet side of said upper portion.

3. The air filter of claim 1 further comprising: a second set of fixed fan blades, installed in said outlet side of said upper portion.

4. The air filter of claim 1 further wherein said lower portion forms a water reservoir.

5. An air filtering system comprising:
   a) an outer housing having an open top, a hollow inner cavity, having a bottom, and an inlet port;
   b) an inlet tube, attached to said inlet port within the hollow inner cavity and extending down towards the bottom of said inner cavity;
   c) an air filtering unit, positioned within said hollow inner cavity, said air filtering unit having:
      i) a housing having an upper portion and a lower portion;
      ii) said upper portion having an air inlet side and an air outlet side, said upper portion further having a divider formed between said air inlet side and said air outlet side such that air cannot pass directly from the air inlet side to the air outlet side;
      iii) an air inlet port, formed in said air inlet side of said upper portion;
      iv) a first plurality of baffles, installed in said air inlet side of said upper portion;
      v) a second plurality of baffles formed in said air outlet side of said upper portion;
      vi) an air outlet port, formed in said outlet side of said upper portion;
      vii) said lower portion of said housing having an air inlet side and an air outlet side, said lower portion further having a divider, having a top and a bottom, formed between said air inlet side and said air outlet side said divider having an opening at the bottom of said divider such that air can pass directly fan the air inlet side to the air outlet side through said opening; and
      viii) a transfer tube, extending from said air inlet side of said upper portion to said air inlet side of said lower portion; and
   d) a vacuum motor, sealably attached to the open top of said canister and in operative communication with the air outlet of said air filtering unit.

6. The air filtering system of claim 5 further comprising an air outlet discharge port, in operative communication with said air outlet port of said air filtering unit.

7. The air filtering system of claim 5 further comprising;
   a) a first set of fixed fan blades, installed in said air inlet side of said upper portion.

8. The air filtering system of claim 5 further comprising: a second set of fixed fan blades, installed in said outlet side of said upper portion.

9. The air filtering system of claim 5 further wherein said lower portion forms a water reservoir.

10. A method of filtering air using an air filtering system having an outer housing having an open top, a hollow inner cavity, having a bottom, and an inlet port; an inlet tube, having a base, attached to said inlet port within the hollow inner cavity and extending down towards the bottom of said inner cavity; a air filtering unit having a housing having an upper portion and a lower portion said upper portion having an air inlet side and an air outlet side; said upper portion further having a divider formed between said air inlet side and said air outlet side such that air cannot pass directly from the air inlet side to the air outlet side; an air inlet port, formed in said air inlet side of said upper portion; a first plurality of baffles, installed in said air inlet side of said upper portion; a second plurality of baffles formed in said air outlet side of said upper portion; an air outlet port, formed in said outlet side of said upper portion; said lower portion of said housing having an air inlet side and an air outlet side, said lower portion further having a divider, having a top and a bottom, formed between said air inlet side and said air outlet side said divider having a plurality of holes positioned at the bottom of said divider such that air can pass directly from the air inlet side to the air outlet side through said plurality of holes; and a transfer tube, extending from said air inlet side of said upper portion to said air inlet side of said lower portion; comprising the steps of:
   a) placing a quantity of water in the bottom of said hollow cavity sufficient to cover the base of said inlet tube;
   b) placing said air filtering unit in said hollow cavity of said outer housing;
   c) sealing said open top of said outer housing with said vacuum motor, such that said vacuum, motor is in operative communication with said air filtering unit; and
   d) energizing said vacuum motor.

11. The method of filtering air of claim 10 further comprising the steps of:
  a) after energizing said vacuum motor, causing an airflow to enter said outer housing through said air inlet port such that the airflow:
    i) passes through said inlet tube into the bottom of said hollow inner cavity;
    ii) passes through the quantity of water in the bottom of said hollow inner cavity;
    iii) passes upward in the inlet side of the upper portion of said air filtering unit;
    iv) passes through said first plurality of baffles in the upper portion of said air filtering unit;
    v) passes through the transfer tube into the lower portion of said air filtering unit;
    vi) passes through a second quantity of water contained in said lower portion of said air filtering unit;
    vii) passes upward from said lower portion of said air filtering unit to the upper portion of said air filtering unit;
    viii) passes through said second plurality of baffles in said upper portion of said air filtering unit; and
    ix) passes into said outlet port on said air filter housing; and
  b) discharging said airflow from said outer housing.

* * * * *